United States Patent Office 3,109,980
Patented Nov. 5, 1963

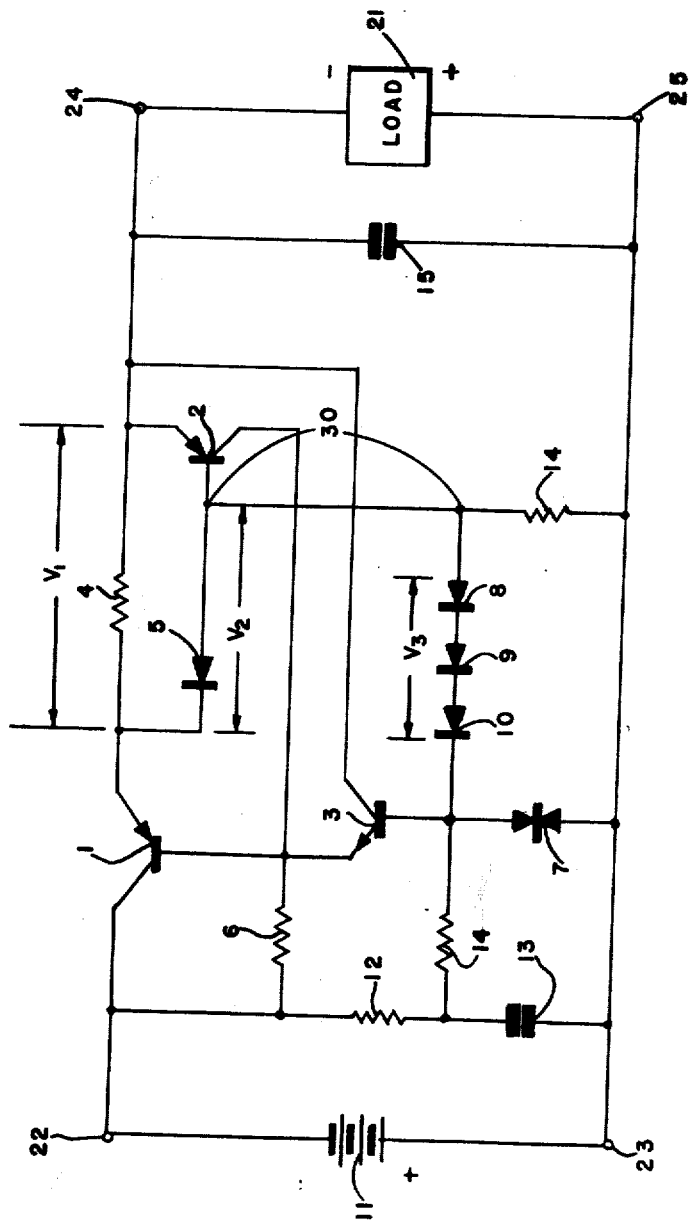

3,109,980
SHORT CIRCUIT PROTECTION DEVICE
Frank L. Wiley, Long Beach, Calif., assignor to
North American Aviation, Inc.
Filed May 29, 1959, Ser. No. 816,849
1 Claim. (Cl. 323—22)

This invention relates to regulation protection circuits and more particularly to a high current and a low voltage responsive circuit for protecting sensitive elements in transistorized power supplies from short circuits.

Semiconductor devices, such as transistors, have short thermal time constants. High currents or voltages across the transistor produce excessive heat seriously impairing the operability and reliability of the transistor. Damaging currents and voltages which often occur in semiconductor elements of a transistorized power supply are most serious when a short circuit occurs across a load. In a typical power supply circuit wherein a power transistor is included in series between a source and a load and associated circuitry maintains a constant voltage across the load, a short circuit across the load immediately results in an excessive current flowing through the series supply transistor. To compensate for this high current, means must be provided in the voltage regulation circuit of the power supply to limit the current. In order to allow proper current limiting, the normal voltage regulation action ceases upon a short circuit with the voltage regulator operating as a constant current supply no longer regulating the voltage across the load. At the same time the current through the short circuit rises, the voltage across the short circuit falls rapidly. The power transistor must now dissipate the voltage between the source and the load with the load voltage being effectively zero. Thus the excessive voltage drop across the power transistor causes excessive heat and tends to break down the transistor.

Transistor short circuit protection circuits of the prior art have been designed to protect transistor elements therein by limiting the voltage and current to predetermined maximum values. Such circuits provide no protection from the inherent low voltage in a short circuit. This low voltage results in an excessive voltage drop and power dissipation across the series supply transistor which seriously damages the transistor.

The device of this invention provides complete protection to transistors in a power supply circuit by providing means for limiting the current to below a predetermined maximum value and providing means for opening the circuit at a predetermined low voltage. Fast acting current and voltage responsive circuits limit the current to a predetermined maximum value and automatically open the supply circuit upon occurrence of currents of a predetermined low voltage across the load.

It is therefore an object of this invention to provide a short circuit protection device.

It is another object of this invention to provide an improved current protection device.

It is still another object of this invention to provide an improved voltage protection device.

It is a further object of this invention to provide a fast acting electronic switch for limiting the current to a predetermined maximum value and for opening a current supply circuit to a load when the voltage across a load falls below a predetermined value.

It is a still further object of this invention to provide an overload current and under voltage protection circuit.

Other objects will become apparent from the following description taken in connection with a single FIGURE which is a schematic diagram of the circuit embodying this invention.

According to the preferred embodidment of this invention an overcurrent and under voltage protection circuit is provided in a regulated power supply to maintain the current through semiconductor elements in the power supply below a predetermined value and to disconnect the source from the load when the voltage across the load falls below a predetermined value. A signal translating device for supplying current from a source to a load has connected in parallel therewith a normally open current responsive circuit which samples the current through the load and controls the signal translating device when current reaches a predetermined overload value, maintaining the current through the signal translating device below said predetermined value. Additionally, there is provided a normally open voltage responsive circuit connected to be responsive to the voltage across the load for opening the circuit through the signal translating device when the voltage across the load falls below a predetermined value. In effect a fast acting electronic switch maintains the current below a predetermined maximum value and cuts off the current supply circuit when the voltage falls below a predetermined value.

Referring more particularly to the single figure, there is illustrated the input terminals 22 and 23 to a transistorized power supply circuit which supplies regulated current to output terminals 24 and 25 connected across a load 21. Input terminals 22 and 23 are responsive to a direct-current source such as, for example, battery 11 with terminal 22 being connected to the minus side and termial 23 being connected to the plus side thereof. In series with source 11 and load 21 is signal translating device 1 which may be illustrated as a PNP transistor having its collector connected to input terminal 22 and its emitter connected through current limiting resistor 4 to output terminal 24 which is the minus side of load 21. In order to provide normal voltage regulation a circuit is provided for controlling the base current of transistor 1 in order to maintain a constant voltage across load 21. This circuit comprises transistor 3 of the NPN type having its emitter connected in common with the base of transistor 1 through resistor 6 to minus terminal 22, its collector connected to minus terminal 24, and its base connected through voltage reference means 7 to positive terminal 23. Voltage reference means 7 may be, for example, a zener diode. Voltage across load 21 is maintained constant due to the low output resistance of transistors 1 and 3 acting as emitter followers. A change in the voltage across load 21 varies the current in transistor 3 with the emitter current rising and falling in accordance with the difference between the load voltage and the reference voltage. The emitter current of transistor 3 in turn controls the base current of transistor 1 in direct proportion to the change in load voltage from the reference voltage.

So far in FIG. 1 the circuitry, known in the art, has been described which provides voltage regulation between source 11 and load 21 for normal operation tending to maintain a constant voltage across load 21. While the circuit described is effective for normal changes in voltage, a rapid change in voltage and current across load 21 due, for example, to a short circuit cannot be compensated for fully or fast enough by the regulating circuit in order to fully protect transistor 1 and other circuit elements in the device. In order to provide short circuit protection, a high current responsive circuit, and a low voltage responsive circuit are provided. The current responsive circuit comprises transistor 2 of the PNP type having its emitter connected to minus terminal 24 and its collector connected in common with the base of transistor 1 through resistor 6 to minus terminal 22. The base of transistor 2 is connected through voltage reference means 5 to the emitter of transistor 1. Voltage reference means 5 may be, for example, a silicon diode stabistor having its cathode connected to the emitter of transistor 1 and its anode connected in common with the base of transistor 2 and point 10 through resistor 14 to plus terminal 23. Diode 5 has a closely defined forward voltage drop from its anode to its cathode which provides a bias potential on the base of transistor 2 which is greater than the potential on the emitter of transistor 2, normally cutting off the flow of current through the emitter-collector circuit of transistor 2. Thus in normal operation the voltage $V_1$ across resistor 4 is less than voltage $V_2$ across diode 5 thereby maintaining transistor 2 cut off for normal operation. As long as the current through load 21 is less than the maximum allowable current, transistor 2 is cut off and normal voltage regulation takes place. When the load current, sampled by resistor 4, rises above the maximum allowable, $V_1$ is greater than $V_2$ and transistor $T_2$ conducts. The current path from the collector of transistor 2 through resistor 6 to terminal 22 removes some of the base current from transistor 1 tending to lower the current through load 21.

Under voltage protection for the power supply circuit is provided by a voltage responsive circuit comprising diodes 8, 9, and 10, all connected in series to provide current flow between point 30 at the base of transistor 2 and the minus terminal 22 when the potential at point 30 rises above a predetermined forward voltage drop established on diodes 8, 9, and 10. The cathode of diode 10 is connected in common with the base of transistor 3 through resistors 14 and 12 in series to minus terminal 22. Diodes 8, 9, and 10 may be replaced by a single zener diode having a reverse voltage drop between point 30 and the base of transistor 3 equal to the desired low voltage protection value. During normal operation of the current regulation circuit no current flows between point 30 and the base of transistor 3 since the voltage reference established at the base of transistor 3 is not sufficiently below the voltage at point 30 to allow conducting through diodes 8, 9, and 10. $V_3$ is substantially zero. Diodes 8, 9, and 10 may be, for example, silicon diodes having substantially zero conduction until a predetermined forward bias voltage is established. Upon occurrence of a short circuit across load 21 the voltage at point 30 with respect to terminal 25 is sufficiently low to cause conduction through diodes 8, 9, and 10. This conduction increases the flow of base current of transistor 2 regeneratively decreasing the base current of transistor 1 and almost immediately cutting off transistor 1.

In operation of the overcurrent and under voltage protection circuit it will be assumed that an overload has just occurred across load 21. The load current sampled by resistor 4 immediately rises above the predetermined value. The voltage $V_1$ increases to a point where it is sufficiently larger than the voltage $V_2$ to cause conduction in transistor 2. The current flowing from the collector of transistor 2 through resistor 6 to terminal 22 decreases the base current of transistor 1 thereby lowering the current through the emitter-collector circuit of transistor 1. As the resistance across load 21 further drops, transistor 2 will control the current in base 1 to maintain a constant current across the load. At the same time the voltage across load 21 drops slightly due to the effect of a constant current through the decreasing load resistance. The voltage at the collector and emitter of transistor 3 correspondingly drops with respect to the reference potential at the base thereof. The flow of current in the emitter of transistor 3 decreases tending to raise the flow of current in the base of transistor 1. As the load resistance decreases, the emitter current of 3 will decrease to zero and the transistor is completely cut off. At this point the voltage regulation circuitry is trying to act as a constant current supply maintaining the current through load 21 at the maximum allowable value and at the same time maintain the voltage at the predetermined value. The action is unstable since the base of transistor 1 is being controlled by the current responsive circuit of transistor 2 and the voltage regulation of transistor 3 is ineffective to maintain the voltage constant across load 21. Transistor 1 is still conducting with transistor 2 regulating the circuit to maintain a constant current across load 21. As the load resistance further decreases, the voltage across load 21 drops further. As the voltage drops, minus terminal 24 rises toward the positive voltage of input terminal 23. The potential at point 30 rises in accordance therewith causing a rise in voltage $V_3$ (the voltage at the base of transistor 3 remaining constant as established by reference means 7). When the voltage $V_3$ equals the forward breakdown voltage established by diodes 8, 9, and 10 (for example, 0.6 volt per diode for silicon diodes), the under voltage protection circuit commences operation with a current path comprising point 30 of the base circuit of transistor 2, diodes 8, 9, and 10, resistors 14 and 12, and minus terminal 22 being established. As the voltage across load 21 drops further the voltage rises further, and the under voltage protection circuit causes more current flow in the base of transistor 2. A regenerative action resulting therefrom causes transistor 2 to go into saturation completely cutting off supply transistor 1 in a very short time, thereby operating to disconnect source 11 from load 21. The extremely fast action of the current responsive circuit and the voltage responsive circuit acting in cooperation cuts off transistor 1 before a direct short circuit is actually accomplished across load 21. This fast action prevents any excessive damage to power transistor 1 and any of the other elements in the current supply circuit.

As shown in the preferred embodiment of the invention, transistors 1 and 2 are of the PNP type and transistor 3 is of the NPN type. It is to be understood, however, that other combinations of PNP and NPN transistors may be used in the device by means well known in the art. Likewise, diodes 8, 9, and 10 may be replaced by a zener diode.

The embodiment disclosed shows an overcurrent and low voltage protection circuit as applied to a voltage regulated power supply. Various other applications of the protection principles are readily apparent. Sensitive electrical instruments may be completely protected without affecting their accuracy by the insertion of the overcurrent and low voltage protection circuits in a manner similar to that prescribed for the power supply circuit in the drawing.

Although this invention has been described and illustrated in detail, it is to be clearly understood that the same is by way of illustration and example only and is not to be taken by way of limitation, the spirit and scope of this invention being limited only by the terms of the appended claim.

I claim:

In a voltage regulated power supply
  a first transistor of one conductivity type for regulating current to a load, said first transistor having a first output electrode connected directly to one terminal of said source, a second output electrode coupled to one terminal of said load through a first resistor in series, and a control electrode,
  a second transistor of a conductivity type complementary to said one conductivity type, said second transistor having a first output electrode connected directly to said control electrode of said first transistor and coupled to said one terminal of said source by a second resistor in series, a second output electrode connected directly to said one terminal of said load, and a control electrode,
  a zener diode having one terminal connected directly to said control electrode of said second transistor and a second terminal connected directly to a second terminal of said source and to a second terminal of said load for voltage regulation, a third transistor of said one conductivity type, said third transistor having a control electrode, a first output electrode connected directly to said one terminal of said load and a second output electrode connected directly to said control electrode of said first transistor, a diode coupling said control electrode of said third transistor to a junction between said first resistor and said second output electrode of said first transistor for overcurrent protection of said first transistor.

a third resistor coupling said control electrode of said third transistor to said second terminal of said load, and diode means coupling a junction between said third resistor and said control electrode of said third transistor to a junction between said zener diode and said control electrode of said second transistor for short circuit protection of said first transistor, said diode means being so poled as to be nonconductive until the voltage drop across said third resistor diminishes below a voltage reference reestablished by said zener diode by an amount predetermined to bias said diode means into conduction, whereby said third transistor is driven to saturation and said first transistor is cut off.

References Cited in the file of this patent

UNITED STATES PATENTS

| | | |
|---|---|---|
| 2,832,900 | Ford | Apr. 29, 1958 |
| 2,888,633 | Carter | May 26, 1959 |
| 2,904,742 | Chase | Sept. 15, 1959 |

UNITED STATES PATENT OFFICE
CERTIFICATE OF CORRECTION

Patent No. 3,109,980 November 5, 1963

Frank L. Wiley

It is hereby certified that error appears in the above numbered patent requiring correction and that the said Letters Patent should read as corrected below.

Column 2, line 30, for "termial" read -- terminal --; column 3, lines 39 and 40, for "conducting" read -- conduction --; column 6, line 6, for "restablished" read -- established --.

Signed and sealed this 14th day of July 1964.

(SEAL)

Attest:

ESTON G. JOHNSON
Attesting Officer

EDWARD J. BRENNER
Commissioner of Patents